United States Patent Office 3,840,639
Patented Oct. 8, 1974

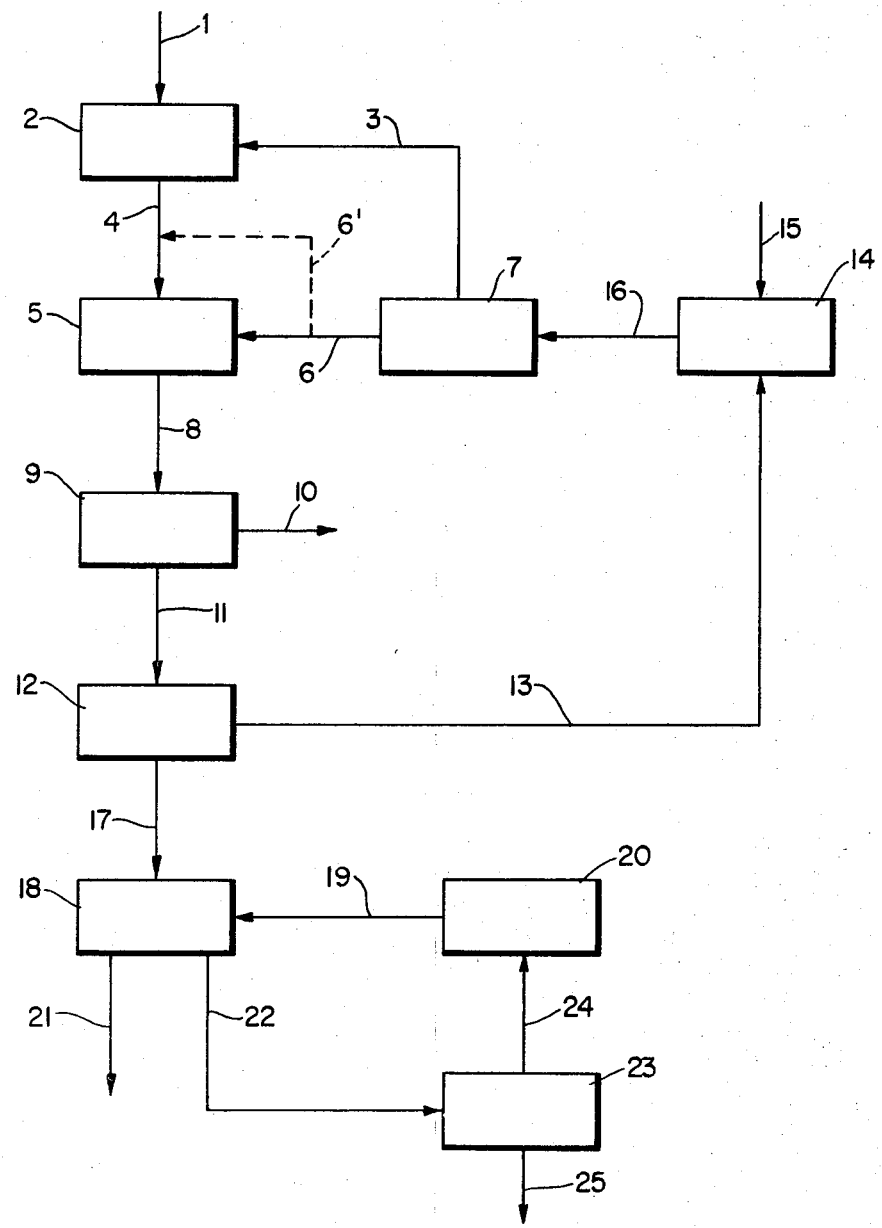

3,840,639
METHOD FOR THE PRODUCTION OF FLUORIDE-FREE POTASSIUM PHOSPHATES
Erhart K. Drechsel, Houston, Tex., assignor to Pennzoil Company, Shreveport, La.
Filed July 3, 1972, Ser. No. 270,103
Int. Cl. C01b 15/16; C22b 3/00; C01f 5/00
U.S. Cl. 423—167    13 Claims

ABSTRACT OF THE DISCLOSURE

There is disclosed a method for the production of alkali dihydrogen phosphates, wherein the process is conducted in the substantial absence of atmospheric, stream and product fluorine pollution, which comprises reacting a fluoride-containing phosphate rock with phosphoric acid in a first stage to form a slurry of a calcium phosphate, and then reacting this intermediate in a second stage with a sulfate salt of the formula $R_2SO_4$ wherein R is alkali metal or one R is alkali metal and the other R is hydrogen, wherein the reaction is conducted in the substantial absence of strong mineral acid. After the reaction is completed, solids are separated which contain gypsum and the insoluble fluorides and yield a resulting product or filtrate comprising phosphoric acid and alkali metal dihydrogen phosphate. In a preferred cyclic process, a portion of this product is recycled for reaction with a mixture of $R_2SO_4$, which may contain $H_2SO_4$, the resulting mixture being separated into a solid phase comprising primarily $R_2SO_4$ and a liquid phase comprising $H_3PO_4$, $RH_2PO_4$ with lesser amounts of $R_2SO_4$. This resulting liquid phase is recycled to the first stage and the $R_2SO_4$ solid phase is recycled to the second stage. The alkali metal dihydrogen phosphate and $H_3PO_4$ which are not recycled are then recovered as products. The essence of this reaction is that it is conducted in the substantial absence of strong mineral acid in the reactor which greatly suppresses the release of fluorides contained in the phosphate rock.

BACKGROUND OF THE INVENTION

Field of the Invention

This invention relates to a method for the operation of an alkali metal dihydrogen phosphate/phosphoric acid plant under such conditions that fluoride pollution is minimized so as to recover a substantially fluoride-free alkali metal dihydrogen phosphate/phosphoric acid product or these products separately. More particularly, this invention relates to a method for the production of alkali metal dihydrogen phosphate and phosphoric acid, both of which are useful in the fertilizer industry and in other fields, by the reaction of phosphate rock with certain acidulation reactants which concentrate at least a portion of the fluorides in the gypsum cake in an insoluble form.

Description of the Prior Art

Phosphoric acid plants are currently operated utilizing a basic and well known process for the acidulation of phosphate rock by reaction of the rock with sulfuric acid to form phosphoric acid with subsequent reaction of the phosphoric acid, with for example ammonia to produce monoammonium phosphate (MAP) and diammonium phosphate (DAP). The phosphoric acid formed in this process is called wet process phosphoric acid and is usually manufactured by treating a phosphate rock (usually fluoroapatite) with the sulfuric acid in a reaction which produces phosphoric acid containing approximately 30 weight percent $P_2O_5$. In this reaction, a by-product is gypsum having the chemical formula $$CaSO_4 \cdot 2H_2O.$$

The fluorine contained in the phosphate rock is usually distributed with roughly one-third evolved as gaseous fluorides which may be recovered with efficient scrubbers, one-third of the 30% $P_2O_5$ acid and one-third in the gypsum cake. After filtration of the gypsum, the phosphoric acid is frequently evaporated to higher strength to obtain higher $P_2O_5$ concentrations which may then be reacted with ammonia if desired and used as a fertilizer. In many operations the usual procedure for disposal of the gypsum is to slurry the gypsum with water and pump the slurry to a large settling pond which is usually formed by building earthen dikes around the perimeter of the pond to retain the gypsum and allow it to settle out therein. Under present practice, the gypsum so disposed is not suitable for profitable use so it is left in the pond. the water containing the soluble fluorides will sometimes seep from these ponds into streams and rivers.

In recent years, both air and water pollution laws and regulations have become more stringent, are becoming even more so and are now being more rigorously enforced. Operating companies have thus had many pollution problems with fluorine emission into the atmoshpere and with the by-product gypsum from these phosphoric acid plants. Thus an important problem in the operation of these wet process phosphoric acid plants has been in the expensive methods for handling the mass amount of fluorine compounds which are liberated in the gaseous and water effluents from such plants. In some phosphate complexes from 10 to 30,000 tons per year of fluorine compounds may be liberated by various methods. It is estimated that in a typical wet process phosphoric acid plant, a portion of the fluorides are evolved into the atmosphere in gaseous form, such as hydrogen fluoride and silicon tetrafluoride which can destroy vegetation and affect other facilities in close proximity to the plant if they are not scrubbed out and such scrubbing systems are not always efficient. A second portion of the fluorine is contained in the gypsum dumps and is subject to leaching into streams. Still another portion of the fluoride is believed to be contained in the final product obtained from the plants and thus when fertilizers from such plants are distributed to the soil, is added to the soil so as to change the fluoride level thereof. It is only in recent years some studies have been made on the effects of the fluorides contained in the final product and indications seem clear that they have a deterrent effect on the long range producing ability of the soil. See for example Kudzin et al., Chem. Ab., 73, 870534 (1970).

There is a great deal of literature and patent art concerning attempts to remove the fluoride values from fluorine-containing phosphate rock in operation of a phosphoric acid plant as the art is replete with methods for supressing the fluoride values in operation of the process or attempting to scrub the fluorine from effluent gases and waste water. Two such patents were issued to Carothers et al. and these are U.S. Pats. 2,954,275 and 2,976,141. In these patents it was believed possible to concentrate a good deal of the fluorides in the gypsum cake and the patents indicate that this was achieved by adding a suppressing amount of an alkali metal salt to the reaction in order to achieve this effect. However, these processes were conducted in the presence of sulfuric acid in the acidulation reactor and the process had no affect on fluoride decomposition and evolution during acidulation. Thus processes of this type have not become importantly commercially in efforts to overcome fluoride pollution in operation of phosphoric acid plants.

There are many other patents available in the phosphoric acid and the fluoride art which suggest the use of scrubbing and recycling plants in an effort to catch or convert the fluorides evolved so that as much as possible of the fluorine can be removed. Nevertheless, in all of these prior art approaches to the problem, there is never any provision made for disposing of the approximately one-third of fluoride contained in the final product nor are there provisions made for obtaining good concentration of the fluorides in a substantially water-insoluble form in the gypsum cake. The present invention provides a breakthrough in this area and for the first time suggests an approach to the operation of a phosphoric acid plant which can be conducted so as to be substantially free of fluorine pollution.

SUMMARY OF THE INVENTION

It is accordingly one object of this invention to provide a process for the operation of an alkali metal dihydrogen phosphate-phosphoric acid plant in the substantial absence of fluoride pollution.

A further object of the invention is to provide a method for the operation of an alkali metal dihydrogen phosphate-phosphoric acid plant and the acidulation of fluorine-containing phosphate rock.

A still further object of the invention is to provide a method in which a fluoride-containing phosphate rock can be acidulated in the presence of an alkali metal sulfate and/or bisulfate and in the substantial absence of strong mineral acid in the reactor so that at least a portion of the fluorides are concentrated in the gypsum cake and, the reaction is conducted in the substantial absence of fluoride air and water pollution to provide a recovery of alkali metal dihydrogen phosphates and phosphoric acid substantially free of fluoride contamination.

Other objects and advantages of the present invention will become apparent as the description thereof proceeds.

In satisfaction of the foregoing objects and advantages there is provided by this invention a method for the preparation of alkali metal dihydrogen phosphates and phosphoric acid substantially free from contamination with fluoride compounds by the reaction of a fluoride-containing phosphate rock with phosphoric acid in a first stage to form a calcium phosphate mixture, and then reacting this mixture in a second stage in the substantial absence of free strong mineral acid, with the reaction product of an alkali metal sulfate and/or bisulfate salt and a sufficient amount of the final product mixture of phosphoric acid and alkali metal dihydrogen phosphate to neutralize any mineral acid entering into the reaction, continuing the reactions at a temperature of about 40–110° C. for complete acidulation of the phosphate rock, separating the solids comprising the gypsum and insoluble fluorides, removing a resulting filtrate comprising phosphoric acid and the alkali metal dihydrogen phosphate, utilizing a portion of this filtrate for recycle to react with the entering sulfate and/or bisulfate salt for neutralization of any sulfuric acid contained therein prior to entering the first and second stage reactions and form a reaction slurry, separating the slurry into a liquid phase comprising primarily phosphoric acid and a solid phase comprising primarily sulfate and/or bisulfate salt, recycling the liquid phase to said first stage and the solid phase to said second stage, and recovering the final product alkali metal dihydrogen phosphate and phosphoric acid from the portion of resulting filtrate which is not recycled. Also provided are methods for operating this process in a continuous manner and methods for the recovery of the alkali metal dihydrogen phosphate from the phosphoric acid to provide substantially fluoride-free alkali metal dihydrogen phosphate and phosphoric acid products.

BRIEF DESCRIPTION OF THE DRAWING

Referring now to the drawing accompanying the application, it will be seen that it represents a diagrammatic flow sheet for conducting one embodiment of the process.

DESCRIPTION OF PREFERRED EMBODIMENTS

As pointed out above, this invention is concerned with a new method for the operation of an alkali metal dihydrogen phosphate-phosphoric acid plant which is conducted in the substantial absence of atmospheric, liquid or solid fluoride pollution. Thus, this process represents a substantial advance in an art where fluorine pollution is a major problem and which, under the new and more stringent environmental laws, must be provided with a solution.

As is known, most of the commercially important phosphate ores mined in this country and particularly in Florida contain 3–4% fluorine after beneficiation. The element is a constituent of fluorapatite which is commonly expressed as $Ca_{10}F_2(PO_4)_6$ and may also be present as calcium fluosilicate ($CaSiF_6$). Silica is a component of phosphate rock and is usually also abundant in most grades of rock that are commonly used in the production of wet process phosphoric acid. In usual processes the fluorine compounds in the phosphate rock react with sulfuric acid during the attack on the rock so that the fluorine appears in vapor form as hydrofluoric acid (HF), silicon tetrafluoride ($SiF_4$), or other gas and in the phosphoric acid as fluosilicic acid ($H_2SiF_6$) and/or fluosilicate salts or other form. Acids from a rock low in silicon may also contain fluosilicic acid. As pointed out above, phosphoric acid plants have been an aggravating source of air and water pollution and further the fluorides turn up as pollutant in the final product fertilizers or other commercial products from these plants.

The present invention is considered to provide a substantial solution to this problem and provides this solution by providing a method by which a fluoride-containing phosphate rock (e.g. fluorapatite) can be acidulated without the necessity of actually mixing strong mineral acid with the rock to effect the acidulation. The key to this novel process is to eliminate the use of strong acid in the acidulation of the phosphate rock. In other words, the use of a strong mineral acid such as sulfuric acid, nitric acid or hydrochloric acid is eliminated.

According to this invention, the fluoride-containing phosphate rock is reacted in an acidulation reactor with phosphoric acid, which is not considered to be a strong mineral acid, and which preferably contains some alkali metal ions, to form a slurry of calcium phosphate (e.g. monocalcium phosphate) and the resulting mixture is then reacted with an alkali metal sulfate or bisulfate in the absence of a strong acid. By the term strong acid is meant those acids which are ionized at greater than 90% at a strength or concentration of 0.1 Normal. By this criteria phosphoric acid and alkali metal sulfates and bisulfates are considered to be moderately strong rather than strong acids. Under the same definition, sulfuric acid, nitric acid, and hydrochloric acid which are ionzed at 0.1 Normal concentrations at 90%, 92% and 92%, respectively, are considered strong acids. Another criteria of defining acidic strength is by ionization constant. Thus the acids employed in the reactions of this invention are considered to have an ionization constant of less than about 0.40.

In this reaction the phosphate rock is initially reacted with sufficient fresh or recycle phosphoric acid to react with most or all of the rock present and form a slurry or mixture of a calcium phosphate, usually monocalcium phosphate. The phosphoric acid reactant may also contain some $R_2SO_4$ salt. A stoichiometric amount or excess of $H_3PO_4$ should be used and the reaction conducted at a temperature of about 40°–110° C. This mixture is then reacted with a stoichiometric amount or slight excess of up to 10% with the reaction product of an alkali metal sulfate or bisulfate and a mixture of the alkali metal dihydrogen phosphate-phosphoric acid. Conveniently the last-named mixture of alkali metal dihydrogen phosphate and phosphoric acid is obtained as a portion of the final product solution. In this reaction it is necessary to maintain the proper stoichiometry so that there are only sufficient sulfate ions present to react with all of the calcium in the $Ca_9(PO_4)_6$ portion of the rock except that theoretically combined with fluorine as $CaF_2$ in the rock.

The alkali metal sulfate or bisulfate reactant is in the form of an aqueous solution, includes both sulfates and hydrogen sulfates, and is preferably of the formula $R_2SO_4$ wherein R is alkali metal (e.g. K or Na) or one R is hydrogen and the other R is alkali metal. Thus the sulfate reactant may be $KHSO_4$, $K_2SO_4$, $NaHSO_4$, $Na_2SO_4$ or mixtures thereof. Potassium hydrogen sulfate ($KHSO_4$) is a highly preferred reactant and may be prepared in any manner but is conveniently prepared by the reaction of sulfuric acid and potassium chloride. Reaction at a temperature of 125°–300° C. with HCl evolution to provide a $KHSO_4$ solution is advantageous. The other salts may be obtained by similar reactions. Mixtures obtained from these reactions which are suitable for use in the process comprise acidic aqueous solutions containing about 30–60 weight percent of $R_2SO_4$ salt. If such starting reactants also contain, for example up to 63 weight percent of sulfuric acid, this free mineral acid is effectively neutralized by reaction with the final product portion prior to introduction into the reaction.

In this stage of the reaction, the $R_2SO_4$ salt is reacted with a sufficient amount of the final product mixture ($RH_2PO_4+H_3PO_4$, where R is alkali metal) to neutralize any sulfuric acid present, the excess $H_3PO_4$ is removed for use in the first stage and a sufficient amount of the remainder is then reacted in a stoichiometric amount or up to a 10% excess with the calcium phosphate mixture to effect the conversion. When the phosphoric acid, sulfate salt, alkali metal dihydrogen phosphate salt and sulfuric acid if present react, there is formed an aqueous mixture containing phosphoric acid and $R_2SO_4$. Thus the acidulation proceeds in two stages. Both stages of the reaction are conducted at a temperature of about 40°–110° C., preferably about 50–90° C.

In the second stage reactor, the resultant mixture comprises primarily ions of the phosphate salt ($RH_2PO_4$ where R is alkali metal) phosphoric acid, the insoluble fluorides, the calcium sulfate or gypsum, and usually a small amount of $HSO_4^-$ and/or $SO_4^=$ ions. In a preferred aspect, these reactions are conducted at the temperatures indicated above with recycle of a slurry of the reacting materials to provide an essentially complete reaction. After the reaction is completed, this mixture is transferred to a separator such as a continuous filter where the solid cake is removed to leave a resultant solution comprising phosphoric acid and the alkali metal dihydrogen phosphate product. The solid cake removed from the separator contains the gypsum ($CaSO_4 \cdot 2H_2O$) and the fluoride in an insoluble form in admixture with the gypsum cake. The fluorides are believed to comprise a complex mixture of fluoride salts which, being in solid form, can be subsequently separated from the gypsum for use as desired. The separation of these fluorides may be achived by solid separation techniques based on densities of the solids and standard beneficiation techniques. Suitable methods of separation are set forth in U.S. Pats. 2,954,275 and 2,976,141. Up to 95% of the fluorides originally in the rock will be found concentrated in the gypsum cake. No appreciable fluoride gas evolution will be noted during the reaction stages.

The resulting solution from this separation will contain a mixture of phosphoric acid and the dihydrogen phosphate ($RH_2PO_4$). In a preferred operation of the process a portion or sufficient amount, usually up to about two-thirds, of this resultant solution is used to react with the sulfate salt necessary for the reaction prior to entry into the second stage acidulation reactor in the manner described above. The remaining mixture of final product may be processed to recover a mixture of the alkali metal dihydrogen phosphate and phosphoric acid or these final products as separate materials. A preferred method for separating the phosphoric acid and alkali metal dihydrogen phosphates as separate materials is by a solvent precipitation step wherein an organic solvent is added to the mixture which dissolves the phosphoric acid and causes the alkali metal dihydrogen phosphate to precipitate. It can then be separated as by filtration and the organic solvent/phosphoric acid mixture distilled to recover the solvent and provide the phosphoric acid in substantially pure form. This latter separation step is fully described in the copending applications of the same assignee, Ser. Nos. 81,820 (now U.S. Pat. No. 3,697,246) and 135,297.

Referring now more specifically to the drawing accompanying this application, it will be seen that a specific embodiment of the process is described therein. In the drawing, a reactor 2 is provided for conducting the first stage acidulation, this reactor preferably being of the multi-chamber type or a series of reactors with internal recycle of the reacting slurry. To this reactor 2 the phosphate rock is added via line 1. Simultaneously, there is added phosphoric acid preferably by recycle through line 3 for reaction with the rock to form a slurry of monocalcium phosphate at a temperature of about 40–110° C. A preferred recycle mixture comprises an aqueous mixture containing about 75–80% by weight of the phosphoric acid and about 20–25% by weight of the $R_2SO_4$ sulfate or bisulfate salt contained in the product from line 13. Sufficient phosphoric acid should be added to provide at least a stoichiometric amount (two moles) so as to react with all the reactive calcium in the rock. An excess of up to 100% of $H_3PO_4$ over the stoichiometric amount is preferred.

This reacted slurry is then taken via line 4 to attack tank or crystallizer 5 where it is reacted with an aqueous slurry or solution of the $R_2SO_4$ salt added via line 6. Alternatively, the reacted slurry can be mixed with the $R_2SO_4$ salt slurry or solution prior to introduction into tank 5 as shown by line 6'. This $R_2SO_4$ slurry or solution in a preferred embodiment has been formed by reaction of a $R_2SO_4/H_2SO_4$ solution with sufficient product comprising a mixture $RH_2PO_4$ and $H_3PO_4$ to neutralize any sulfuric acid present. As shown in the drawing, product recycle from line 13 and $R_2SO_4$ salt from line 15 are mixed in reactor 14 at a temperature of about 40–110° C. The resulting slurry is then transferred by line 16 to separator 7 where a separation is effected between the resulting solid phase $R_2SO_4$ salt and liquid phase phosphoric acid. Separator 7 is preferably a centrifuge, decanter or thickener operated in known manner to make the separation. While a complete separation can be made, it is sufficient for purposes of the process if there is an $H_3PO_4/R_2SO_4$ liquid/solid separation of about 75 to 25 weight percent. Thus, in a preferred aspect, the phosphoric acid solution in line 3 will contain about 75–80 weight percent of the $H_3PO_4$ and 20–25 weight percent of the $R_2SO_4$ salt whereas the salt slurry added to reactor 5 via line 6 and/or 6' comprise about 75–80 weight percent of the $R_2SO_4$ salt and 20–25 weight percent of the $H_3PO_4$.

In the reactor or crystallizer 5, the materials are reacted at a temperature of about 40–110° C. with slurry recycle to achieve complete reaction and produce filterable gypsum crystals. A multi-chamber reactor or series of reactors is preferred for effecting the reaction.

The resulting slurry from reactor 5 is removed through line 8 to a separator or filter 9, preferably a continuous filter from which a solid cake is removed via line 10. This solid cake contains the gypsum or calcium sulfate together with the insoluble fluorides contained in intimate admixture therewith. The fluorides may be separated from the gypsum cake in any desired manner as described above.

The resulting solution is taken from the separator 9 by line 11 and comprises a solution of phosphoric acid and alkali metal dihydrogen phosphate salt. This solution is removed to station 12 where it is then divided in order to recycle a portion thereof to the main reaction stages by line 13. Essentially, for optimum reaction, about two-thirds of this solution, by weight or by mole, are recycled through line 13 for reaction in tank 14 while about one-third is removed through line 17 for product recovery. In more specific terms it can be said that about 60–80 weight percent of the final product solution should be recycled and about 20–40% of the product should be removed for recovery. The portion of the product solution recycled via line 13 is treated in reactor 14 as described above.

The remaining portion of product taken off through line 17 is then worked up to recover the components contained therein. Any desired method for recovery of the final products may be utilized and there are various methods for effecting such recoveries known to the art. A preferred method comprises contacting the solution with an organic solvent such as a lower alkyl alcohol or lower alkyl ketone, preferably methanol or acetone, from line 19 in precipitator 18 which solvent dissolves the phosphoric acid and precipitates the alkali metal dihydrogen phosphate. The solvent is usually employed in a weight ratio of solvent to total solution of about 0.5:1 to 3:1, preferably 1:1. The treatment is preferably carried out with agitation at a temperature of about 20–60° C.

Treatment of the solution with the organic solvent in tank 18 provides a means whereby the alkali metal dihydrogen phosphate salt can be caused to precipitate and recovered through line 21 with substantially all of the phosphoric acid remaining in the solution. The organic solvent also precipitates most of the impurities present in the solution. Thus, treatment by the organic solvent causes the alkali metal dihydrogen phosphate and any impurities to precipitate and these may thereafter be recovered, preferably after filtration and subsequent washing, to produce crystals which are thereafter dried. The solution containing the organic solvent and phosphoric acid from the precipitation step may then be removed by line 22 and distilled at 23 for recovery of the organic solvent through line 24 which is sent to solvent storage 20 for reuse. The solvent-free phosphoric acid stream is then removed at line 25 and may if desired be treated in any desired manner.

In conducting the reaction, it is desirable that the concentration of dissolved solids in the reactors not exceed about 60% and preferably lie in a range of 10–50%, as higher concentrations of dissolved solids, which are often found in phosphoric acid plants, are not optimum because of the differences in solubilities of the salts present. Therefore, a maximum of about 40% by weight of the dissolved solids is desirable in conducting the reaction.

As indicated, the basic reactions are conducted at a temperature of about 40–110° C. with a highly preferred temperature range being 55–70° C. To this extent the temperature range is important as conversions may suffer outside the indicated ranges. The residence or hold-up time in the continuous process is variable but may range from about 2 to 12 hours and preferably is about 4 to 8 hours for optimum results.

There are, of course, various other possibilities for working up the products resulting from the process of this invention. For example, the salt of the formula $$RH_2PO_4$$

obtained after the solvent precipitation step can of course be dissolved in water and the $K_2O/P_2O_5$ concentration adjusted in any desired manner. One procedure is to add potassium hydrogen sulfate, calcium oxide and/or ammonia to the resulting solution to adjust the $K_2O/P_2O_5$ ratio and/or add ammonium values and provide a wide range of final product materials suitable as fertilizers. These final products may be provided in either solution form or in solid form. Alternatively, the final products, before or after $K_2O/P_2O_5$ ratio adjustment may be polymerized by high temperature heating at a temperature of about 250–800° C. to form high plant food value polymerized final products. The sodium dihydrogen phosphates are also widely useful in the detergent industry.

In an optional method for treatment of the final products in lieu of the organic precipitation step, the mixture of phosphoric acid and alkali metal dihydrogen phosphate salt may be contacted with ammonia to form monoammonium or diammonium phosphates and provide N-P-K fertilizers in a wide range of values. In addition, minor nutrients necessary for the soil could also be added in these steps. Various work-up procedures for these processes are disclosed and fully discussed in copending application Ser. No. 135,297 of this assignee.

In the above-identified continuous process set forth in the drawing accompanying this application there are of course various ways to practice the process which would still utilize the concept of the process as disclosed and claimed herein. The important aspect to be appreciated regarding this process is that for the first time there is provided a procedure by which an alkali metal dihydrogen phosphate-phosphoric acid plant can be operated in the substantial absence of fluorine pollution. In the process described herein, there is no appreciable evolution of fluoroine gases during the acidulation reactions and at least a portion of the fluoride values are concentrated in the gypsum cake and are thereby effectively removed from the system.

The following examples are provided to further illustrate the invention but they are not to be considered as limited thereto. In these examples and throughout this specification, parts are by weight unless otherwise indicated.

EXAMPLE I

This example illustrates the fact that conversion is achieved utilizing the reactants set forth in the process of the present invention with minimum fluoride pollution. This example was conducted in a batch manner to illustrate that the conversion in fact does occur in the absence of strong mineral acid.

In this example, 75 grams of phosphate rock (fluorapatite) containing 3.55 weight percent of fluorine was reacted at 70° C. for 4 hours with 187.3 grams of 75% furnace grade phosphoric acid and 81.6 grams of water to form a monocalcium phosphate reaction slurry. At a temperature of 70° C., there was then added continuously over a period of three hours 81.6 grams of $KHSO_4$ contained in 197.4 grams of water to provide the final product slurry after stirring for an additional hour. This product was then filtered to provide a filter cake and a first filtrate. The cake was washed with 50 cc. of water which was combined with the first filtrate. Thereafter the filter cake was slurried with 200 cc. of water and refiltered to provide the final gypsum cake and a second filtrate. Thus, this example shows the essential aspects of the reaction. The ions and components of each of the products are set forth as follows:

| Ions | First filtrate Wt. percent | Wt. | Second filtrate Wt. percent | Wt. | Cake Wt. percent | Wt. |
|---|---|---|---|---|---|---|
| Ca | 0.53 | 2.17 | 0.26 | 0.79 | 24.4 | 21.88 |
| K | 4.00 | 16.39 | 1.17 | 3.56 | 2.55 | 2.11 |
| $SO_4$ | 0.77 | 3.16 | 0.45 | 1.37 | 58.2 | 52.19 |
| $PO_4$ | 33.69 | 138.06 | 8.38 | 25.53 | 4.85 | 4.35 |
| Fe | 0.085 | 0.348 | 0.024 | 0.073 | 0.03 | 0.027 |
| Al | | | | | | |
| F | | | 0.0078 | 0.023 | 2.08 | 1.80 |

EXAMPLE II

This experiment was conducted as in Example I except that the initial reaction of phosphate rock and phosphoric acid was operated for twenty hours, the first water wash of the filter cake was with 57 cc. of water and the cake was then reslurried with 220 cc. of water. The ions in each of the products recovered were as follows:

| Ions | First filtrate Wt. percent | Wt. | Second filtrate Wt. percent | Wt. | Cake Wt. percent | Wt. |
|---|---|---|---|---|---|---|
| Ca | 0.62 | 2.40 | 0.24 | 0.747 | 23.9 | 20.15 |
| K | 3.93 | 15.238 | 1.37 | 4.263 | 2.48 | 2.09 |
| $SO_4$ | 0.64 | 2.482 | 0.54 | 1.680 | 54.9 | 46.20 |
| $PO_4$ | 33.35 | 129.31 | 8.98 | 27.943 | 5.51 | 4.65 |
| Fe | 0.09 | 0.349 | 0.03 | 0.093 | 0.04 | 0.034 |
| Al | | | | | | |
| F | 0.002 | 0.008 | 0.05 | 0.156 | 1.69 | 1.684 |

In each of Examples I and II, it will be seen that the final products contain large amounts of K and $PO_4$ ions and very minor amounts of fluorine values, most of the latter being concentrated in the gypsum cake.

EXAMPLE III

This example illustrates operation of the process with recycle of a portion of the product solution to the system. In this example the $R_2SO_4$ sulfate is $KHSO_4$.

A mixture of 408.3 parts of potassium bisulfate and 726 parts of 96% sulfuric acid is prereacted with a portion of the product; i.e. 966.3 parts of $KH_2PO_4$ plus 695.8 parts of $H_3PO_4$ in 1788 parts of water. This reaction is completed almost immediately and results in a slurry of 1374.6 parts of $KHSO_4$ in 1391.6 parts of $H_3PO_4$ and 1818 parts of water. The concentration of products is 60.3%. Under these conditions a minimum of 70% of the $KHSO_4$ may be separated. By decantation of the $KHSO_4$ slurry in $H_3PO_4$ the $KHSO_4$ solids are separated from the solution, the liquid remaining containing the bulk of the phosphoric acid and water plus some dissolved $KHSO_4$. This phosphoric acid together with 1246 parts of wash (make-up) water from the gypsum filtration is then utilized to attack 1260 parts of phosphate rock (74.0% BPL=33.9% $P_2O_5$ and having a $CaP/_2O_5$ weight ratio of 1.33) with agitation at a temperature of 70° C. After approximately three hours of reaction time the remaining potassium bisulfate slurry containing some phosphoric acid and water is gradually introduced into the reaction mixture. By this time gypsum crystallization is already well underway and after another two to three hours reaction period gypsum growth has proceeded to a point wherein rapid filtration via a suitable filter is carried out. The filtrate from this separation contains approximately 4760 parts of solution of which 3450 are recycled with the potassium bisulfate/sulfuric acid feed as indicated earlier. This leaves 1310 parts of 0-27-9 product for a recovery of 631 parts out of 702.3 theoretical parts. Losses of $K_2O$ are 14.1 parts and losses of $P_2O_5$ were 42.6 parts. Both values represent approximately 10% of unrecovered input. Gypsum recovery after washing with 1246 parts of make-up water as indicated earlier was found to be approximately 2000 parts of wet cake and contains most of the aforementioned $K_2O$ and $P_2O_5$ losses as well as the insoluble fluorides and silica.

EXAMPLE IV

This example was conducted continuously as shown in the procedural diagram set forth in the drawing accompanying this application except that the resulting filtrate removed via line 17 was not treated with the organic solvent. Further, the continuous filter 9 was operated with a continuous water wash of the gypsum cake, the water wash being recycled to the crystallizer 5. The sulfate used was a solution of $KHSO_4$ and $H_2SO_4$. The conditions for the reaction are as set forth in Example III. Separator 7 was a centrifuge. The following Table sets forth the components present in each reactor and stream of the drawing and details the compounds and ions present therein. In this Table, the reference numeral corresponding to the stream or reactor is set forth as necessary. These component amounts are as follows:

TABLE I

| | Rock feed | | $KHSO_4$ feed | | Gypsum cake | | Product solution | | Water wash | |
|---|---|---|---|---|---|---|---|---|---|---|
| | Wt. | Wt. percent | Wt. | Wt. percent | Wt. | Wt. percent | Wt. | Wt. percent | Wt. | Wt. percent |
| Stream composition: | | | | | | | | | | |
| Ca | 35.70 | 35.70 | | | 34.90 | 14.54 | 0.80 | 0.70 | | |
| K | 0.08 | 0.08 | 9.35 | 10.44 | 0.93 | 0.39 | 8.49 | 7.38 | | |
| $SO_4$ | 0.50 | 0.50 | 76.73 | 85.67 | 76.85 | 32.01 | 0.38 | 0.33 | | |
| $PO_4$ | 45.40 | 45.40 | | | 4.54 | 1.89 | 40.86 | 35.53 | | |
| F | 3.55 | 3.55 | | | 2.84 | 1.18 | 0.71 | 0.62 | | |
| Other | 14.77 | 14.77 | 3.48 | 3.89 | 120.00 | 49.99 | 63.76 | 55.44 | 168.85 | 100.0 |
| Total | 100.00 | 100.00 | 89.56 | 100.00 | 240.06 | 100.00 | 115.00 | 100.00 | 168.85 | 100.0 |
| Percent $K_2O$ | | | | | | | | 10.2 | | |
| Percent $P_5O_5$ | | | | | | | | 30.5 | | |

| | Filtrate | | Recycle Stream | | Feed to centrifuge | | $H_3PO_4$ recycle | |
|---|---|---|---|---|---|---|---|---|
| | Wt. | Wt. percent | Wt. | Wt. percent | Wt. | Wt. percent | Wt. | Wt. percent |
| Stream composition: | | | | | | | | |
| Ca | 7.91 | 0.70 | 7.11 | 0.70 | 7.11 | 0.64 | 6.22 | 0.72 |
| K | 83.94 | 7.38 | 75.39 | 7.38 | 84.80 | 7.63 | 47.67 | 5.49 |
| $SO_4$ | 3.80 | 0.33 | 3.42 | 0.33 | 80.15 | 7.21 | 10.02 | 1.15 |
| $PO_4$ | 404.05 | 35.53 | 363.19 | 35.53 | 363.19 | 32.69 | 342.38 | 39.40 |
| F | 7.03 | 0.62 | 6.32 | 0.62 | 6.32 | 0.57 | 5.53 | 0.64 |
| Other | 670.93 | 55.44 | 566.17 | 55.44 | 569.65 | 51.27 | 457.25 | 52.60 |
| Total | 1,177.66 | 100.00 | 1,021.60 | 100.00 | 1,111.22 | 100.01 | 869.07 | 100.00 |

| | $KHSO_4$ | | Digestor outlet | | Water wash recycle | | Slurry to filter | |
|---|---|---|---|---|---|---|---|---|
| | Wt. | Wt. percent | Wt. | Wt. percent | Wt. | Wt. percent | Wt. | Wt. percent |
| Stream composition: | | | | | | | | |
| Ca | 0.89 | 0.37 | 41.92 | 4.33 | 0.14 | 0.08 | 42.95 | 3.10 |
| K | 37.13 | 15.33 | 47.75 | 4.93 | 1.44 | 0.82 | 86.32 | 6.23 |
| $SO_4$ | 70.13 | 28.96 | 10.52 | 1.09 | 0.06 | 0.03 | 80.71 | 5.83 |
| $PO_4$ | 20.81 | 8.59 | 387.78 | 40.01 | 6.95 | 3.98 | 415.54 | 29.99 |
| F | 0.79 | 0.33 | 9.08 | 0.94 | 0.12 | 0.07 | 9.99 | 0.72 |
| Other | 112.40 | 46.41 | 472.02 | 48.70 | 166.02 | 95.02 | 749.92 | 54.13 |
| Total | 242.15 | 99.99 | 969.07 | 100.00 | 174.73 | 100.00 | 1,385.43 | 100.00 |

From a review of the above Table, it will be seen that about 80% of the fluorides are concentrated in the gypsum cake. Further, the final product solution contained in line 17 is very low in fluoride concentration.

The invention has been described herein with reference to certain preferred embodiments. However, as obvious variations thereon will become apparent to those skilled in the art the invention is not to be considered as limited thereto.

What is claimed is:

1. A continuous process for the preparation of alkali metal dihydrogen phosphates and phosphoric acid and the removal of fluorine values from phosphate rock, comprising the steps of reacting phosphate rock with sufficient phosphoric acid to effect substantially complete reaction with the calcium in the rock in a first stage at a temperature of about 40–110° C. to form a monocalcium phosphate mixture, reacting this mixture in a second stage at a temperature of about 40–110° C. with a stoichiometric amount or slight excess of an aqueous solution containing a sulfate of the formula $R_2SO_4$ wherein R is alkali metal or one R is hydrogen and the other R is alkali metal, to form a reacting slurry of phosphoric acid, alkali metal dihydrogen phosphate and gypsum, separating a solid gypsum cake from the system to provide a resulting solution containing phosphoric acid and alkali metal dihydrogen phosphate, dividing the resulting solution into two portions, reacting one portion with an alkali metal sulfate salt solution, wherein said alkali metal salt is of the formula $R_2SO_4$, where R is as described above, using a sufficient amount of said one portion of resulting solution to neutralize any sulfuric acid present in the system, and form a mixture of phosphoric acid and alkali metal sulfate or bisulfate, separating the solid which comprises a slurry of sulfate solids and phosphoric acid liquid, recycling at least a portion of the phosphoric acid liquid to the first stage phosphate rock reaction and recycling at least a portion of the sulfate solids to the second stage for reaction with the monocalcium phosphate mixture, contacting the second portion of the resulting solution with a lower alkyl alcohol, lower alkyl ketone or mixture thereof to dissolve the phosphoric acid present and precipitate the solid alkali metal dihydrogen phosphate product and recovering the solid product.

2. A process according to claim 1 wherein the sulfate or bisulfate salt is selected from the group consisting of potassium sulfate, sodium sulfate, potassium hydrogen sulfate and sodium hydrogen sulfate.

3. A process according to claim 2 wherein in the first stage reactor the phosphoric acid is reacted with the phosphate rock in stoichiometric amounts or up to an excess of about 10% of the phosphoric acid.

4. A process according to claim 1 wherein the $R_2SO_4$ salt is prepared by the reaction of alkali metal chloride and sulfuric acid with evolution of hydrogen chloride and the salt is then dissolved in water to form an aqueous solution.

5. A process according to claim 3 wherein the first and second stage reactions are conducted in separate reactors with continuous recycle of the reacting slurry in each reactor.

6. A process according to claim 4 wherein the gypsum cake is filtered in a continuous filter with continuous water wash and recycle of the water wash to the first and/or second stage reactor.

7. A process according to claim 6 wherein the organic solvent is distilled from the phosphoric acid and recycled for reuse in the process.

8. A process according to claim 7 wherein sufficient resulting solution is recycled and reacted with the sulfate solution to react with any sulfuric acid present.

9. A process according to claim 8 wherein about 60–80 weight percent of the resulting solution is recycled to the system and about 20–40 weight percent of the solution is removed from the system.

10. A process according to claim 9 wherein a portion of resulting solution is reacted with the $R_2SO_4$ salt, the mixture is separated into a phosphoric acid portion and a $R_2SO_4$ salt portion, the phosphoric acid and $R_2SO_4$ salt portions are separated, the phosphoric acid portion is recycled to said first stage and said $R_2SO_4$ salt portion is recycled to said second stage.

11. A process according to claim 10 wherein the phosphoric acid solution recycled to the first stage reactor contains about 70–75% of the phosphoric acid and about 20–25% of the $R_2SO_4$ salt.

12. A process according to claim 11 wherein the alkali metal sulfate or bisulfate recovered from these separations is recycled to the second stage as a solid slurry containing about 70–75% of the alkali metal sulfate or bisulfate and 20–25% of the phosphoric acid.

13. A process according to claim 12 wherein the bisulfate salt is $KHSO_4$ and the solid product is $KH_2PO_4$.

References Cited

UNITED STATES PATENTS

| | | | |
|---|---|---|---|
| 2,914,380 | 11/1959 | Vickery | 423—307 |
| 3,663,168 | 5/1972 | Rubin et al. | |
| 2,899,292 | 8/1959 | Vickery | 423—309 |

OTHER REFERENCES

Thompson, "New Route Cuts Cost for Potassium Orthophosphate," Chemical Engineering, Apr. 5, 1971, pp. 83–85.

OSCAR R. VERTIZ, Primary Examiner

G. A. HELLER, Assistant Examiner

U.S. Cl. X.R.

423—308, 311, 319

UNITED STATES PATENT OFFICE
CERTIFICATE OF CORRECTION

Patent No. 3,840,639                 Dated November 19, 1974

Inventor(s) Erhart K. Drechsel

It is certified that error appears in the above-identified patent and that said Letters Patent are hereby corrected as shown below:

Column 1, line 2, "metal" should be should be inserted between "alkali" and "dihydrogen";

Column 2, line 4, "of" should be --in--;

Column 4, line 26, "pollutant" should be --pollutants--;

Column 9, line 37, "CaP/$_2$O$_5$" should be --CaO/P$_2$O$_5$--;

Table 1, last line, "P$_5$O$_5$" should be --P$_2$O$_5$--; and

Col. 11, line 42, "phosphric" should be --phosphoric--.

Signed and sealed this 11th day of February 1975.

(SEAL)
Attest:

RUTH C. MASON
Attesting Officer

C. MARHSALL DANN
Commissioner of Patents
and Trademarks